United States Patent [19]

Swiatosz

[11] 4,303,396
[45] Dec. 1, 1981

[54] FIRE FIGHTING TRAINING DEVICE AND METHOD

[75] Inventor: Edmund Swiatosz, Maitland, Fla.

[73] Assignee: The United States of America as represented by the Secretary of the Navy, Washington, D.C.

[21] Appl. No.: 86,977

[22] Filed: Oct. 22, 1979

[51] Int. Cl.³ .................................................. G09B 9/00
[52] U.S. Cl. .................................................. 434/226
[58] Field of Search ........................... 35/10; 434/226

[56] References Cited
U.S. PATENT DOCUMENTS 3,675,342 7/1972 Wolff ..................................... 35/10
3,675,342 7/1972 Swiatosz et al. ..................... 35/10
4,001,949 1/1977 Francis ................................. 35/10

OTHER PUBLICATIONS

Technical Report: NAVTRAEQUIPCEN, IH-241, "Feasability Demonstration of a Non-Pollutant Synthetic Fire Fighting Trainer", by Edmund Swiatosz et al., Dec. 1941.

Primary Examiner—Anton O. Oechsle
Attorney, Agent, or Firm—Richard S. Sciascia; Robert W. Adams

[57] ABSTRACT

A training device that is a simulator of oil bilge, oil spray, and Class A fires. The device is fully controllable and imitates the appearance of a machine or engine room. Propane burners are used to provide flames, and flame and water sensors are used to monitor trainee performance. A switch controlled by a dummy valve is also included to be operated by the trainee in its proper sequence of applied procedures.

11 Claims, 3 Drawing Figures

FIRE FIGHTING TRAINING DEVICE AND METHOD

BACKGROUND OF THE INVENTION

The present invention relates to the field of trainers. In particular, the present invention relates to the training of firefighters for the most effective response to Class A fires, and oil spray and/or oil bilge fires. The procedures employed to combat the controlled fire generated by the present invention are the same as those recommended by the experts to combat operational fires of the same types. And, the simulator's response to proper procedures is likewise the same. The result is that training on the simulator of the present invention prepares the firefighter to combat unexpected oil and wood, rag, etc., fires. And, it does so in a safe and realistic environment.

The prior art in the field is relatively non-existent. Before the present invention, oil spray fires may not have been simulated at all. Uncontrolled fires in operational equipment were primary training ground for firefighters. And, most often these were encountered not in training at all, but in response to an emergency. Where training on oil or wood fire was attempted under controlled settings, the fire itself was uncontrolled and involved the dousing of pipes or disposables with gasoline, and igniting. The flame was realistic, but the fire did not respond realistically. Procedures that are improper for a Class A fire in the one case, or oil fire in the other, were effective against the gasoline fire which was, in reality, not a fire of the type to be encountered but a Class B fire. In addition, the gasoline fire was self-extinguishing as the gasoline was consumed by flame. Ineffectual procedures were thereby interpreted by the trainee to be successful, an erroneous and potentially dangerous conclusion.

As a result, previous attempts to simulate Class A or oil bilge and/or oil spray fires for firefighter training have been unsatisfactory. The use of a Class B material, gasoline, to initiate such fires has never approached the realism desired. The unbridled use of gasoline creates a flame wholly dissimilar to the appearance generated by a Class A fire, where smoke is often the only visible evidence of the fire. And, where a flame is present in an oil spawned fire it is most often churned into a more visible and violent flame than the nearly invisible flame associated with many gasoline fires.

Taken as a whole, the previous techniques have failed to prepare the trainee for what is to be expected from an oil or Class A fire. And, more importantly, with that failure the trainee is ill-prepared to take efficient and effective action to quell the fire most expeditiously. Time equals loss and possible injury in this environment, and experience increases efficiency and reduces time of exposure. Accordingly, the need for the realism and responsiveness afforded by the present invention has been long felt by those in the training of firefighters.

A primary objective of the present invention is to improve the preparedness of firefighters against oil spray and/or oil bilge fires by accurately simulating the appearance and dynamic response of such fires to various firefighting techniques. Improper techniques and improperly applied techniques will become acutely obvious to the trainee. He will be guided by the results he obtains and the instruction he receives to the most successful techniques, the optimum firefighting procedures for the type of fire encountered. Just as Class A fires are dynamic, the present invention reacts dynamically to optimize the training experience and leave the trainee who has learned his lessons, with a sense of confidence.

An additional objective of the present invention is to provide a controlled emergency environment that responds realistically to techniques applied by firefighters against Class A fires. Further, the appearance of both the fire and the apparatus are to be realistic in order to acquaint the trainee, as nearly as possible in a simulated environment, with the factors that will be, or are likely to be, encountered in combatting a fire in wood, cloth, etc.

An advantage of the present invention is that it is a potentially non-pollutant device. It has essentially no particulates and few gaseous products, compared to the other smoke abatement systems which include water spray and/or after burner systems. In addition, it is fully adjustable and immediately responsive, and thoroughly safe. It has the extra capability of being interrupted on command, and then resuming the simulation after detailed corrective instruction or adaptive training has been completed. Monitoring of the trainee's performance from a remote location is also contemplated, as an optional feature of the invention.

The present application is a companion case to U.S. patent application Ser. No. 086,978, entitled Deep Fat Fryer Fire Fighting Simulator, and U.S. patent application Ser. No. 086,859, entitled Electrical Fire Fighting Simulator, which have all been filed concurrently.

DESCRIPTION OF A PREFERRED EMBODIMENT

The present invention is a simulator of Class A and Class B fire, and is intended for use as a training tool.

Figure 1:
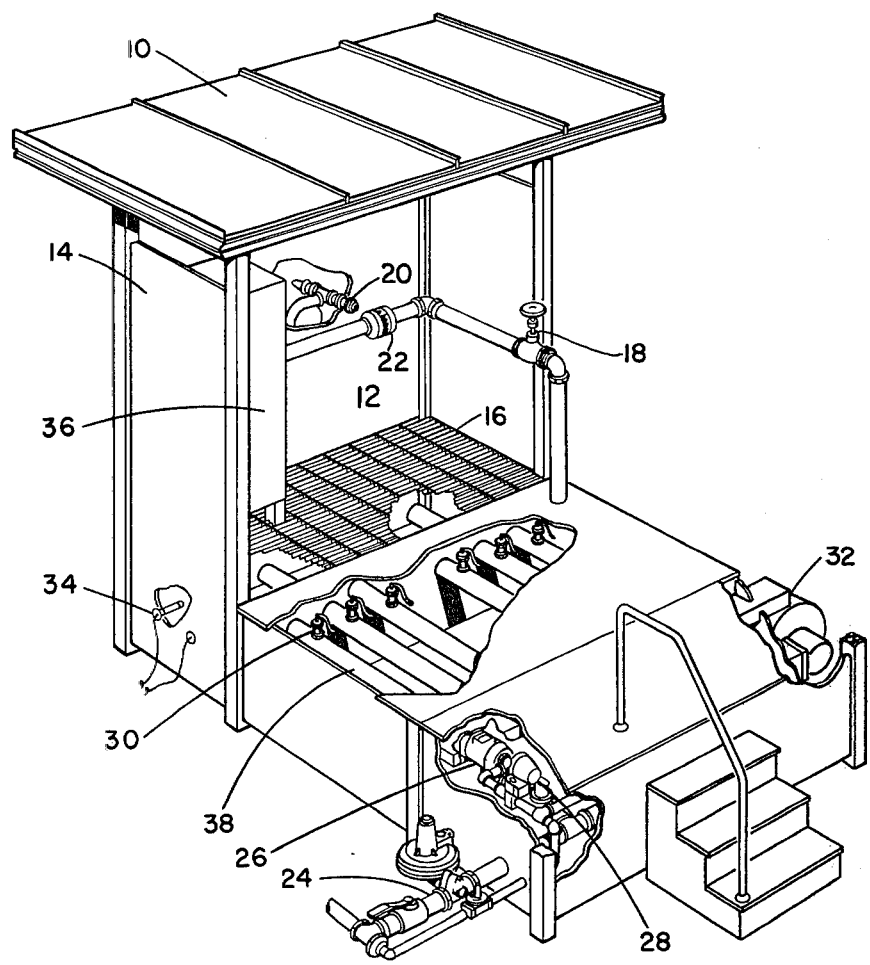
FIG. 1 is an illustration, partly in cut-away form, of a preferred embodiment of the present invention.

FIG. 1 shows an embodiment of the present invention that has housing 10 with back wall 12 and side walls 14. Included is elevated floor 16 that is a grating through which flame is provided from below to appear as an oil bilge fire. Or, if material is placed on grate 16 that appears as Class A material, the flame will appear to be a wood, cloth, paper, plastic, etc., fire, as will be discussed below. Also included is an elevated floor adjacent the grating, that provides standing and working room for the trainees tasked to combat the flames controllably generated by the simulator.

Simulated valve 18 is an operational switch that is responsive to manual activation by the trainee. The designed-for procedures, used in combatting an oil spray fire simulated by burner 20 in combination with adjoining flange 22 on the plumbing coupled to valve 18, contemplates that the valve controlling the pressure-supplied oil is to be closed. Simulated valve 18 is included to accommodate the procedures. Turning the valve control to closing operates an electrical switch which provides an indication of trainee performance that is combined with other indicators, as will be described.

The simulator has two types of flame. One is provided by burner 20 with flange 22, and imitates an oil spray fire, a fire whose fuel is provided under pressure. The other is provided through gate 16 to imitate a fire whose fuel is not provided under pressure.

The gas supply for the latter is provided through fuel line 24 to burner 26. Igniter 30 of burner 26 initiates the flame in the blend of air received from blower 32 and gas provided from line 24, conveyed by conduit 38. An extinguishment agent properly played over the flame into grate 16 will be sensed and communicated via lead 34 to a control unit, not shown. Safety scanner 28 is representative of a flame sensor, and column 36 is representative of optional fixtures that may be added for functional realism.

Housing 10 can be constructed of heavy gauge steel to resist the effects of repeated exposure to fire and bombardment with water and chemical extinguishment agents under high pressure. The remainder of the simulator can also be constructed of heavy gauge steel where feasible for strength and durability. The simulator can be constructed in modules and fitted together, or as a unit formed from panels or other appropriate components, using good and standard techniques. The elevated floor adjacent grate 16 may be formed of two sections, one above igniter 30 in conduit 38 and another, above burner 26. The objective of the structural assembly is for the simulator to be rugged, and at the same time be realistic in appearance to the environment typically encountered in combatting machine or engine room fires.

Figure 2:
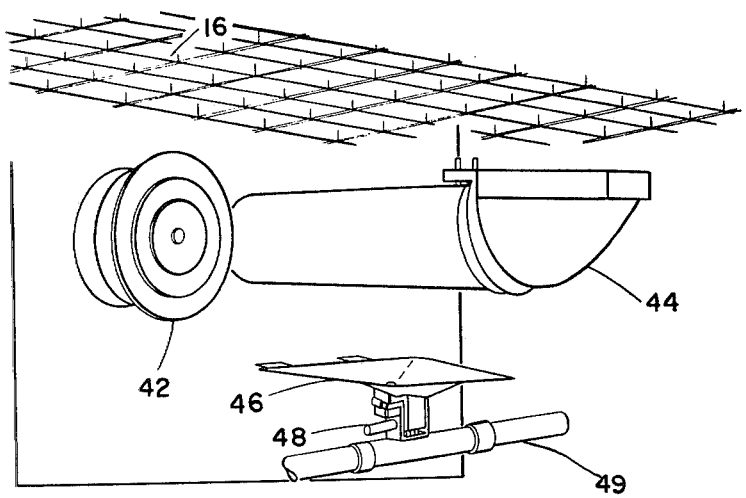
FIG. 2 is a plan view of the embodiment of FIG. 1 as seen from below the grate floor, showing flame nozzles and the system for sensing the extinguishment agent.

FIG. 2 shows one set of the flame nozzles used in the embodiment of FIG. 1. Nozzle 42 provides a horizontal flame that is enlarged by its conical spreader to engulf a large and deep area of grate 16. Nozzle 44 provides a vertically directed flame that is also enlarged by its flame spreader. The area to be covered by the flame from nozzle 44 can be selected to be circular, or elongated in width or depth, by choosing the spreader. The nozzles are representative of the arrangements, that can be applied to the multiple burner tubes shown in FIG. 1 that pierce the bulkhead into the enclosure covered by grate 16.

FIG. 2 also shows pan 46 and sensor probe 48, mounted on support 49. Pan 46 is a collector for accumulating the fire extinguishment agent that falls through grate 16 and drops into the pan. It may be rectangular with four panels sloped downwardly toward the center, having an aperture near the center for passing the agent. Agent that collects in pan 46 flows toward the aperture, through it, and onto probe 48.

Sensor probe 48 is a device that is chosen to be responsive to the extinguishment agent used. For oil spray fires, the agent PKP is recommended. PKP is a potassium carbonate powder of fine texture that flows easily. A fine water spray can be added to form a slurry. For oil bilge fires, foam is recommended. It attacks the blaze by smothering it. The procedures for applying the agents to such fires will be described below in conjunction with the operation of the simulator.

Sensor 48 may be any of a variety of commercially available sensors that are triggered by a determinable quantity of water, or it may be a specially designed sensor instrument. The sensor should be selected to provide a reliable detection of the quantity of spray deposited over the fire extinguishing area for a given period of time.

When the minimum threshold of spray required to trigger probe 48 is exceeded, a control unit, not shown, is electrically notified. The unit can be as simple as a gate set or as complex as a programmed computer which clocks for recycling and flashback capability. The requirements are that the unit must be responsive to at least two sensors when oil bilge and oil spray fires are to be simulated together, probe 48 and switch 18 triggered by operating the simulated valve.

As an alternative, the responsibility to detect the quantity of retardant that is properly applied in a predetermined period of time can be transferred from sensor 48 to the control unit. In such a case probe 48 is simplified. Further, a rudimentary system can be constructed that does not concern itself at all with the duration of flooding, or quantity of retardant, but is interested only in detecting that retardant has been directed into the well below grate 16 and that the valve/switch has been closed thereafter, as will be discussed below.

Along these lines sensors with relays, or separately available relays, can be used that inherently hold a trigger condition for approximately two or more seconds. Use of such devices for probe 48 would permit the bilge fire from the lower burner to be extinguished and held "off" by the inherency of the relay to provide a realistic period of time without additional delay circuitry in the control unit for the trainee to close valve/switch 18.

The control unit may employ the teachings that are available in the prior art related to fire fighting trainers. For example, the techniques explored by H. Wolfe in U.S. Pat. No. 3,675,342 entitled Fire Fighting Trainer, and by E. Swiatosz and W. Chambers in U.S. Pat. No. 3,675,343 entitled Fire Fighting and Control Simulator, provide a background from which a control unit can be adapted in accordance with the needs of the present invention as it is employed in its various embodiments, chosen to meet specific applications encountered by the user.

Figure 3:
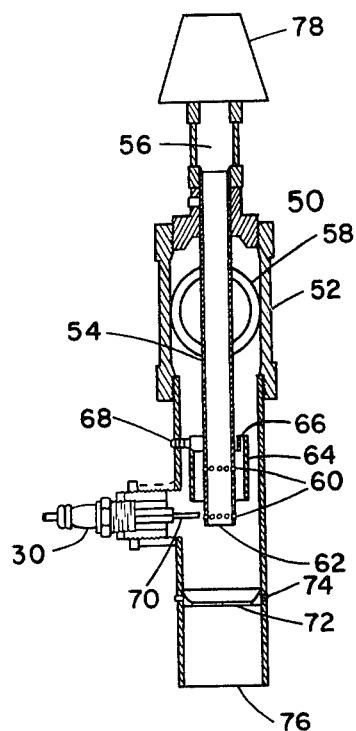
FIG. 3 is a cross-sectional view of the burner shown in FIG. 1.

FIG. 3 shows burner 50 that can be used for burner 20, and will be discussed below as such. The burner shown can also be used for burner 26, if desired. In its six-inch version, it has a nominal one point five million BTU/hr propane gas capacity for a corresponding two-foot by two-foot flame area. Corresponding flame height is about four feet, and about six feet for four million BTUs/hr. The six-inch version is suitable for use as burner 26. A smaller version is recommended for burner 20. Burner 50 provides exceptional ignition capability over a wide range of air-fuel ratios with sufficiently routine burning to be reliably used with conventional flame sensors.

Burner 50 is a tubular member having central section 52 which houses port 58 for receiving forced air, as from blower 32. Above section 52 is section 56 which houses a port for receiving propane, or other gaseous, fuel, which is not shown because in this example by happenstance it flows into the page. Flame sensor 78 is graphically depicted above section 56, looking down conduit 54. Conduit 54 conveys the gas into chamber 64 where it mixes through apertures 60 with air supplied by port 58 through opening 66, which substantially encircles conduit 64. Additional air passes outside chamber 64 into the section below for further mixing to attain complete burning. Set screw 68 is mounted onto chamber 64, and is adjustable for centering conduit 54 within burner 50 and establishing optimum spacing between igniter 30 and chamber 64. Igniter 30 provides the spark from electrode 70 that initiates the flame into the area near lower tip 62 of conduit 54.

Mixing ring 72 is mounted on the wall of nozzle 76 by set screws 74 and is important for complete burning. Ring 72 has an inner surface at a diameter that progressively decreases at an increasing rate in the downstream direction. This creates turbulence or lateral movement in the gases which promotes mixing.

Propane gas is a recommended fuel for the burner. The fuel is provided by plumbing from a separate source that is not shown. As a safety measure and for control purposes, the gas supply should be routinely valved using commonly accepted standards from the propane and gas burner arts.

Dual valves in the supply channel are contemplated. The first is responsive to switch 18 in the case of burner 20, and to sensor 48 in the case of burner 26. The second is responsive to sensor 78. Sensor 78 is a pilot light sensor. The purpose of sensor 78 is to assure that gas does not escape into the training facility through the burner unless a flame is present within the burner to consume it.

Sensors 78 can be a Honeywell "Mini Peeper," an ultravoilet (UV) sensitive device. It is known that the type of flame which results from burning propane gas and many other if not all fuels, is a generator of UV radiation. So, the use of UV sensors accomplishes the desired result of automatically detecting the presence or absence of the flames.

The desired result can also be obtained with a flame rod, strategically placed in the flames. Or, infrared sensor(s) can be experimented with to determine their appropriateness for a desired application. Infrared sensors have been found to be unsatisfactory in most instances, however, because they often respond to the heated metal in the burner after the flame has been removed.

Probe sensor 48 operates to control burner 26. Valve/switch 18 operates to control burner 20. Where oil spray and oil bilge fires are simulated together, both switch 18 and sensor 48 must be triggered to terminate the flames. An electronic gating mechanism such as a logic gate is intended for that purpose. The outputs of both triggered devices are coupled to a control unit, not shown, which operates a solenoid to close the above-mentioned valves in the gas supply lines when extinguishment agent has been detected by sensor 48 and switch 18 has been turned "off."

The control mechanism may be made more sophisticated, if desired, to include a relay which maintains the output from sensor 48 a preselected and adjustable period of time after the flame from burner 26 has been first knocked down. Failure to close valve/switch 18 within the preselected period could reopen the gas supply to burner 26 for the added realism of "flashback," an element wherein the fire spontaneously reignites.

Based upon the above description and the operation that is recited below, the control unit and relays could be assembled from available components and conventional engineering skill. Operable embodiments of the invention could be practiced with as simple a circuit as a gating arrangement or as complex a system as a programmed computer. It is expected that the user will find sufficient advantages in most of the options described above to incorporate circuitry specifically designed for the intended purpose.

The control unit for upper burner 20 can be separate from the control unit for lower burner 26, although most users will find it more convenient to assemble the circuitry as a unit. As an additional advantage of combining the control operations, greater latitude is available in sequencing and interaction, and in programming if the control unit is a progammable device.

The intended training sequence on the simulator and its operation will now be described to provide the reader with an understanding of the objectives of the device and its components. Other sequences are available, as desired, although the one described below has been found to be most advantageous. All are to be considered as being within the teaching of the present invention.

Valves are opened by the instructor to provide gas to burners 20 and 26 for generating flames that are visible to the trainee. Fire is directed onto the deflector strips of union simulating flange 22 under appropriate gas pressure and air-fuel ratio to appear to emerge from flange 22 as an oil spray fire. Fire is also generated by igniter 30 and provided through spreaders 42 and 44 into the well below grate 16.

The trainee approaches the flames by ascending onto the solid floor of housing 10 in front of the walled member. Foam is directed into the flames to quell the simulated oil bilge fire below grate 16. A slurry solution of PKP is also directed into the flames to drive back the simulated oil spray fire in flange 22 and assist in quelling the oil bilge flames.

Extinguishment agent collects in pan 46 and triggers probe 48 to operate a solenoid in the gas supply line to burner 26 to reduce the supply of gas. The flame appears to extinguish.

With PKP being played on flange 22, the trainee "closes" valve 18 and thereby activates the switch. Valve/switch 18 simulates eliminating the supply of fuel to the flange 22 that would flow through the pipe from valve 18 in operational equipment. Switch 18 reduces the supply of gas to burner 20 by controlling a valve in its gas supply line. The oil spray fire appears to extinguish.

If switch 18 is tripped during the "off" condition of burner 26, the fire is extinguished and the training encounter is at an end. The simulator shuts down. If switch 18 is not operated timely, however, the control unit can be designed to provide flashback capabilities that will reopen the valve to burner 26 and reignite the oil bilge fire. Then, the trainee must deal once again with the flames under grate 16 in addition to the simulated oil spray fire.

Each of the fires can be operated separately and independently of the other, if desired, according to the desired application. The use of both fires, simultaneously, has shown substantial benefits in realism, however, and the inclusion of that capability is recommended for most designs.

Obviously, many modifications and variations of the present invention are possible in light of the above teachings. It is, therefore, to be understood that within the scope of the appended claims the invention may be practiced otherwise than as specifically described.

What is claimed is:

1. Apparatus that imitates the appearance of an engine or machine room and simulates oil bilge and oil spray fires, and Class A fires, for firefighting training, comprising:
   a metal housing having an elevated floor, a portion of said floor being a metal grate similar in appearance to conventional metal flooring in an engine room, wherein said housing includes wall members that enclose said metal grate, and the area immediately above said grate, on three sides;

plumbing positioned above said grate having at least one manually operable switch means for simulating the appearance and operation of a manual oil line valve, and one flange means downstream in said plumbing from said switch means, for simulating a union in said plumbing and spreading flame directed thereon;

first burner means mounted beneath said elevated floor having at least one flame providing nozzle extending beneath said grate portion for controllably producing fire through said grate;

second burner means mounted through a said wall member having a flame providing nozzle directed onto said flange means for controllably producing fire that appears from a position outside said enclosure to emanate from said simulated union;

sensor means mounted beneath said grate, having a probe sensor and a pan member for collecting fire extinguishment agent deposited into said pan and directing said agent onto said probe, wherein said sensor changes electrical states in response to the presence of a preselected said agent; and valving means in the fuel supply to said first and said second burner means that is responsive to said sensor for controlling the supply of fuel to said first burner means, and that is responsive to said valve simulating switch for controlling the supply of fuel to said second burner means.

2. The apparatus of claim 1, wherein said second burner means includes a burner that is a tubular member comprising tubular segments of various diameters with a central segment being of relatively large diameter and including an input port for receiving air; with a second segment of smaller diameter mounted in an airtight coupling to a first end of said central segment and including an input port for receiving gaseous fuel, and a conduit member extending within said segments from said airtight coupling to beyond said central segment wherein said conduit member includes apertures near its extended end and a tubular member spaced from said conduit member is mounted to encompass said extended end with said apertures and promote mixing of air supplied by said air input port with fuel conveyed by said conduit; and, a third segment mounted in an airtight coupling to the end of said central segment opposite said first end having an igniter mounted in the wall thereof in alignment with an aperture in said extended end for igniting said fuel/air mixture, and a mixing member downstream from said igniter that is a ring mounted against the inner diameter of said third segment and has an inner surface which decreases in diameter at a progressively increasing rate in the downstream direction.

3. The apparatus of claim 2, wherein the downstream end of said third segment is the flame providing nozzle of said burner, and said burner further includes a flame sensor mounted on the end of said second tubular segment that is opposite said first airtight coupling, and said sensor is oriented longitudinally with said segments to sense the presence of flame through said conduit.

4. The apparatus of claim 3, wherein said first and second burner means each include a blower for supplying forced air thereto.

5. The apparatus of claim 1, wherein said metal housing includes a solid platform portion of said floor on the fourth side of said grate that, with said first, second, and third sides, surround said grate, such that said area above said grate is exposed to the side occupied by said platform, wherein the area beneath said grate is separated by a barrier with at least one aperture from the area beneath said platform and said first burner means extends through said aperture(s) from beneath said platform, and said platform provides standing room for trainees.

6. The apparatus of claim 5, wherein said platform has adjacent and equally elevated first and second sections with said first section adjacent said grate, and said first burner means includes at least one flame igniter, and a fuel/air mixing device under said second section for each said igniter, with the associated flame igniter being under said first section.

7. The apparatus of claim 6, wherein said housing includes a heat shield attached to said wall members in covering relationship to said grate and spaced thereabove.

8. The apparatus of claim 7, wherein said plumbing includes a pipe connecting said valve simulating switch to said flange and to said housing.

9. The apparatus of claim 1, wherein said pan member of said sensor means is rectangular and made of four panels that slope evenly from the perimeter toward the center, with an opening provided near the center of the converging panels through which agent collected by said pan is permitted to flow, and said probe is positioned beneath said opening for receiving said agent.

10. The apparatus of claim 1, wherein said sensor means includes a relay coupled to said probe for maintaining the electrical state occurring in said probe in the presence of said agent, for a predetermined period of time.

11. A method of simulating oil bilge and oil spray fires, and Class A fires, for training a firefighter trainee during a training session, comprising the steps of:

simulating the structural appearance of a fuel line and the structural appearance of a metal grating as flooring;

generating a controlled fire through said simulated metal grating floor;

reducing said controlled fire by automatic response to fire retardant material directed by said trainee properly, as determined by preselected parameters, to extinguish said simulated fire;

ending said training session when said trainee has satisfactorily completed preselected procedures subsequently to properly extinguishing said simulated fire;

restoring said controlled fire by automatically discontinuing said reduction when said trainee fails to satisfactorily complete said preselected procedures subsequent to properly extinguishing said simulated fire.

* * * * *